(12) United States Patent
Wang et al.

(10) Patent No.: US 12,044,013 B2
(45) Date of Patent: *Jul. 23, 2024

(54) POLYOLEFIN THERMOPLASTIC ROOFING MEMBRANES WITH IMPROVED BURN RESISTIVITY

(71) Applicant: Holcim Technology Ltd, Zug (CH)

(72) Inventors: Hao Wang, Carmel, IN (US); Donna Tippmann, Fishers, IN (US); Michael J. Hubbard, Goshen, IN (US); Todd Taykowski, Noblesville, IN (US); Timothy McQuillen, Westfield, IN (US)

(73) Assignee: Holcim Technology Ltd, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,861

(22) Filed: Jan. 12, 2023

(65) Prior Publication Data

US 2023/0332408 A1 Oct. 19, 2023

Related U.S. Application Data

(63) Continuation of application No. 16/066,828, filed as application No. PCT/US2016/069076 on Dec. 29, 2016, now Pat. No. 11,555,312.

(60) Provisional application No. 62/273,510, filed on Dec. 31, 2015.

(51) Int. Cl.
| | | |
|---|---|---|
| *E04D 5/10* | (2006.01) | |
| *B32B 7/12* | (2006.01) | |
| *B32B 27/08* | (2006.01) | |
| *B32B 27/20* | (2006.01) | |
| *C08K 3/22* | (2006.01) | |
| *C08K 3/26* | (2006.01) | |

(52) U.S. Cl.
CPC .................. *E04D 5/10* (2013.01); *B32B 7/12* (2013.01); *B32B 27/08* (2013.01); *B32B 27/20* (2013.01); *B32B 2260/046* (2013.01); *B32B 2264/102* (2013.01); *B32B 2264/104* (2013.01); *B32B 2264/12* (2013.01); *B32B 2419/06* (2013.01); *C08K 2003/2224* (2013.01); *C08K 2003/265* (2013.01); *Y10T 428/258* (2015.01)

(58) Field of Classification Search
None
See application file for complete search history.

(56) References Cited

U.S. PATENT DOCUMENTS

| | | |
|---|---|---|
| 4,141,187 A | 2/1979 | Graves |
| 4,957,968 A | 9/1990 | Adur et al. |
| 5,437,923 A | 8/1995 | Kalkanoglu |
| 5,573,092 A | 11/1996 | Gabilondo |
| 5,624,999 A | 4/1997 | Lombardi et al. |
| 5,891,563 A | 4/1999 | Letts |
| 6,044,604 A | 4/2000 | Clayton et al. |
| 6,117,375 A | 9/2000 | Garrett et al. |
| 6,414,070 B1 | 7/2002 | Kausch et al. |
| 6,503,984 B2 | 1/2003 | Johnson et al. |
| 6,544,909 B1 | 4/2003 | Venkataswamy et al. |
| 6,656,982 B2 | 12/2003 | Yasuda |
| 6,720,067 B2 | 4/2004 | Takahashi et al. |
| 6,927,258 B2 | 8/2005 | Datta et al. |
| 7,355,089 B2 | 4/2008 | Chang et al. |
| 7,387,753 B2 | 6/2008 | Tackett et al. |
| 7,579,397 B2 | 8/2009 | Nelson |
| 7,612,120 B2 | 11/2009 | Letts |
| 7,741,397 B2 | 6/2010 | Liang |
| 7,838,568 B2 | 11/2010 | Letts et al. |
| 7,882,671 B2 | 2/2011 | Bruce et al. |
| 7,893,166 B2 | 2/2011 | Shan et al. |
| 7,964,672 B2 | 6/2011 | Ouhadi |
| 8,440,284 B2 | 5/2013 | Kelly |
| 9,045,904 B2 | 6/2015 | Hubbard et al. |
| 9,434,827 B2 | 9/2016 | Frei et al. |
| 2002/0013379 A1 | 1/2002 | Singh et al. |
| 2002/0049266 A1 | 4/2002 | Yasuda |
| 2003/0032351 A1 | 2/2003 | Horner |
| 2003/0082365 A1 | 5/2003 | Geary et al. |
| 2003/0153656 A1 | 8/2003 | Sjerps |
| 2003/0198813 A1 | 10/2003 | Howell |
| 2004/0033741 A1 | 2/2004 | Peng |

(Continued)

FOREIGN PATENT DOCUMENTS

| | | |
|---|---|---|
| CN | 101668808 A | 3/2010 |
| EP | 1245620 A2 | 10/2002 |

(Continued)

OTHER PUBLICATIONS

International Search Report and Written Opinion for Appl. No. PCT/US2014/069988 dated Mar. 5, 2015, p. 1-4.
ASTM D 6878-03 standard, 2003, 3 Pages. (Year: 2003).
International Search Report and Written Opinion for Appl. No. PCT/US2016/016975 dated Apr. 26, 2016.

(Continued)

*Primary Examiner* — Cheng Yuan Huang
(74) *Attorney, Agent, or Firm* — Renner, Kenner; Arthur M. Reginelli

(57) ABSTRACT

A multi-layered thermoplastic roofing membrane comprising a planar body including at least three layers, said at least three layers including (i) a top layer that includes magnesium hydroxide dispersed within a thermoplastic resin, (ii) an upper middle layer disposed below said top layer and including magnesium hydroxide and calcium carbonate dispersed within a thermoplastic resin, and (iii) a lower layer disposed below said upper middle layer and including magnesium hydroxide and calcium carbonate dispersed within a thermoplastic resin.

17 Claims, 2 Drawing Sheets

(56) References Cited

U.S. PATENT DOCUMENTS

| | | |
|---|---|---|
| 2004/0109983 A1 | 6/2004 | Rotter et al. |
| 2004/0146681 A1 | 7/2004 | Naipawer, III et al. |
| 2004/0198912 A1 | 10/2004 | Dharmarajan et al. |
| 2004/0248751 A1 | 12/2004 | Johnson et al. |
| 2005/0183365 A1 | 8/2005 | Naipawer, III et al. |
| 2006/0024794 A1 | 2/2006 | Li et al. |
| 2006/0046084 A1 | 3/2006 | Yang et al. |
| 2006/0127664 A1 | 6/2006 | Geary et al. |
| 2006/0179749 A1 | 8/2006 | Brandt et al. |
| 2006/0199930 A1 | 9/2006 | Li Pi Shan et al. |
| 2007/0193167 A1 | 8/2007 | Bruce et al. |
| 2007/0281119 A1* | 12/2007 | Di Stefano ........... E04D 12/002 428/40.1 |
| 2008/0179574 A1 | 7/2008 | Yang et al. |
| 2008/0206583 A1 | 8/2008 | Phan et al. |
| 2009/0049802 A1 | 2/2009 | Johnson et al. |
| 2009/0137168 A1 | 5/2009 | Peng |
| 2009/0181216 A1 | 7/2009 | Peng |
| 2009/0269565 A1 | 10/2009 | Peng |
| 2009/0275690 A1 | 11/2009 | Weaver et al. |
| 2010/0029827 A1 | 2/2010 | Ansems et al. |
| 2010/0084158 A1 | 4/2010 | Gau et al. |
| 2010/0197844 A1 | 8/2010 | Yang et al. |
| 2011/0003094 A1 | 1/2011 | Becker |
| 2011/0118404 A1 | 5/2011 | Jung et al. |
| 2011/0139340 A1 | 6/2011 | Naipawer, III et al. |
| 2012/0045623 A1 | 2/2012 | Delaney |
| 2012/0167510 A1 | 7/2012 | Brandt et al. |
| 2012/0244340 A1 | 9/2012 | Peng |
| 2013/0036694 A1 | 2/2013 | Brandt et al. |
| 2013/0164524 A1 | 6/2013 | Letts et al. |
| 2014/0011008 A1 | 1/2014 | Letts et al. |
| 2014/0127443 A1 | 5/2014 | Zhou |
| 2014/0150960 A1 | 6/2014 | Peng |
| 2014/0373467 A1 | 12/2014 | Wang et al. |
| 2015/0038629 A1 | 2/2015 | Ultsch |
| 2015/0119515 A1 | 4/2015 | Frei et al. |
| 2015/0152643 A1 | 6/2015 | Hubbard |
| 2015/0174871 A1 | 6/2015 | Sollmann |
| 2015/0314511 A1 | 11/2015 | Stoiljkovic et al. |
| 2016/0207283 A1 | 7/2016 | Wang |
| 2016/0312470 A1 | 10/2016 | Wang et al. |
| 2018/0023301 A1 | 1/2018 | Wang et al. |
| 2018/0094439 A1 | 4/2018 | Wang et al. |
| 2018/0162109 A1 | 6/2018 | Gopalan et al. |
| 2018/0162971 A1 | 6/2018 | Chen et al. |

FOREIGN PATENT DOCUMENTS

| | | | |
|---|---|---|---|
| EP | 1655331 A1 | 5/2006 | |
| WO | 2001066627 A1 | 9/2001 | |
| WO | 2001096110 A1 | 12/2001 | |
| WO | 2003016168 A1 | 2/2003 | |
| WO | 2007136761 A1 | 11/2007 | |
| WO | WO-2008036113 A1 * | 3/2008 | ............ B32B 25/14 |
| WO | 2013102208 A1 | 7/2013 | |
| WO | 2014001224 A1 | 1/2014 | |
| WO | 2014008501 A1 | 1/2014 | |
| WO | 2014078760 A1 | 5/2014 | |
| WO | 2014105809 A1 | 7/2014 | |
| WO | 2015089384 A1 | 6/2015 | |
| WO | 2015164852 A1 | 10/2015 | |

OTHER PUBLICATIONS

International Search Report and Written Opinion for Appl. No. PCT/US2015/027698 dated Jul. 30, 2015. pp. 1-10.
International Search Report and Written Opinion for Appl. No. PCT/US2015/041707 dated Sep. 8, 2015, pp. 1-3.
International Search Report and Written Opinion for Appl. No. PCT/US2016/069073 dated Apr. 3, 2017, pp. 1-10.
International Search Report and Written Opinion for Appl. No. PCT/US2016/016960 dated Apr. 26, 2016.
Thermal Tech Equipment. Shore Durometer Conversion Chart, Jun. 13, 2003-Dec. 10, 2016, 1 page.
U.S. Appl. No. 15/548,912.
U.S. Appl. No. 15/548,938.
U.S. Appl. No. 15/306,537.
U.S. Appl. No. 16/108,282.
U.S. Appl. No. 16/066,699.
U.S. Appl. No. 16/066,828.
U.S. Appl. No. 15/103,542.
U.S. Appl. No. 15/327,867.
PCT Application No. PCT/US2020/013529.
PCT Application No. PCT/US2020/017410.

* cited by examiner

POLYOLEFIN THERMOPLASTIC ROOFING MEMBRANES WITH IMPROVED BURN RESISTIVITY

This application is a continuation application of U.S. application Ser. No. 16/066,828 filed on Jun. 28, 2018, now U.S. Pat. No. 11,555,312, which is a national-stage application of PCT/US2016/069076 filed on Dec. 29, 2016, which claims the benefit of U.S. Provisional Application No. 62/273,510, filed on Dec. 31, 2015, which are incorporated herein by reference.

FIELD OF THE INVENTION

Embodiments of the present invention provide polyolefin thermoplastic roofing membranes having improved burn resistivity. In one or more embodiments, the membranes include at least three distinct layers, with at least two of the layers including magnesium hydroxide and calcium carbonate.

BACKGROUND OF THE INVENTION

Thermoplastic roofing membranes, especially those membranes engineered to cover flat or low-sloped roofs, are known in the art. Many of these membranes are engineered to meet the industry standards defined in ASTM D 790. Many commercially-available thermoplastic roofing membranes include fabric-reinforced thermoplastic sheets. These membranes are fabricated by sandwiching a reinforcing fabric between two extruded thermoplastic sheets to provide a laminated structure. The sheets are fabricated from extruded thermoplastic materials that include various additives, such as inert filler, anti-weathering additives, and flame retardants. As the skilled person appreciates, the type and amount of additives employed, such as the filler, can impact the mechanical properties of the membrane including tensile and tear strength.

Generally, there are two types of thermoplastic roofing membranes. The first includes those fabricated from polyolefins (TPO) such as ethylene-propylene reactor copolymers (e.g. CA10A available from Lyondellbasell). The second includes those fabricated from polyvinylchloride (PVC). While each system may offer certain advantages, PVC is generally believed to offer better burn resistivity than polyolefin systems, especially when evaluated for spread of flame derived from an external source, as may be tested by standardized testing according to, for example, UL790.

SUMMARY OF THE INVENTION

One or more embodiments of the present invention provide a multi-layered thermoplastic roofing membrane comprising a planar body including at least three layers, said at least three layers including (i) a top layer that includes magnesium hydroxide dispersed within a thermoplastic resin, (ii) an upper middle layer disposed below said top layer and including magnesium hydroxide and calcium carbonate dispersed within a thermoplastic resin, and (iii) a lower layer disposed below said upper middle layer and including magnesium hydroxide and calcium carbonate dispersed within a thermoplastic resin.

Other embodiments of the present invention provide a roof system comprising a substrate and thermoplastic membrane affixed to the substrate, where the thermoplastic membrane is a planar body including at least three layers, said at least three layers including (i) a top layer that includes magnesium hydroxide dispersed within a thermoplastic resin, (ii) an upper middle layer disposed below said top layer and including magnesium hydroxide and calcium carbonate dispersed within a thermoplastic resin, and (iii) a lower layer disposed below said upper middle layer and including magnesium hydroxide and calcium carbonate dispersed within a thermoplastic resin.

DETAILED DESCRIPTION OF ILLUSTRATIVE EMBODIMENTS

Embodiments of the present invention are based, at least in part, on the discovery of polyolefin-based thermoplastic roofing membranes that demonstrate improved burn resistivity (e.g. resistance to spread of flame per UL 790). In one or more embodiments, the membranes are multi-layered membranes that include at least three distinct layers with at least two of the layers including a magnesium hydroxide ($Mg(OH)_2$) and calcium carbonate ($CaCO_3$) as filler materials. It is believed that the arrangement of the layers and the filler content of each layer (e.g. the amount of $Mg(OH)_2$ and $CaCO_3$ within the respective layers) uniquely provides the membranes with burn resistivity that is comparable to PVC membranes.

Membrane Construction

In one or more embodiments, the membranes of the present invention are multi-layered membranes that include one or more coextruded layers. In this respect, U.S. Publ. Nos. 2009/0137168, 2009/0181216, 2009/0269565, 2007/0193167, and 2007/0194482 are incorporated herein by reference.

Figure 1:
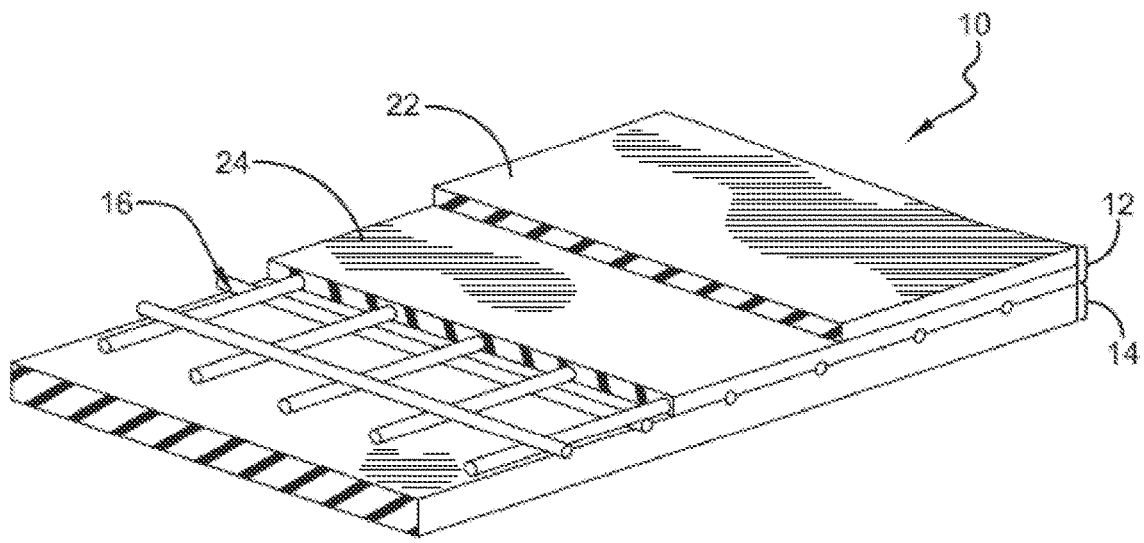
FIG. 1 is a perspective view of a three-layered laminate membrane according to embodiments of the present invention.

Membranes according to one or more embodiments of the present invention can be described with reference to FIG. 1. In this embodiment, the membrane includes planar body 10, which also may be referred to as sheet 10 or panel 10. In one or more embodiments, panel 10 is a planar body that includes three distinct layers including top layer 22, upper middle layer 24, and bottom layer 14, which may also be referred to as lower combination 14 or simply layer 14. As shown, top layer 22 and upper middle layer 24 may be collectively referred to as upper combination or layer 12. In one or more embodiments, layer 12 and layer 14 are laminated to each other and an optional reinforcement 16 (e.g. scrim reinforcement) may be sandwiched between the layers. In one or more embodiments, top layer 22 and upper middle layer 24 may be in the form of a single extrudate formed by, for example, co-extrusion techniques.

Figure 2:
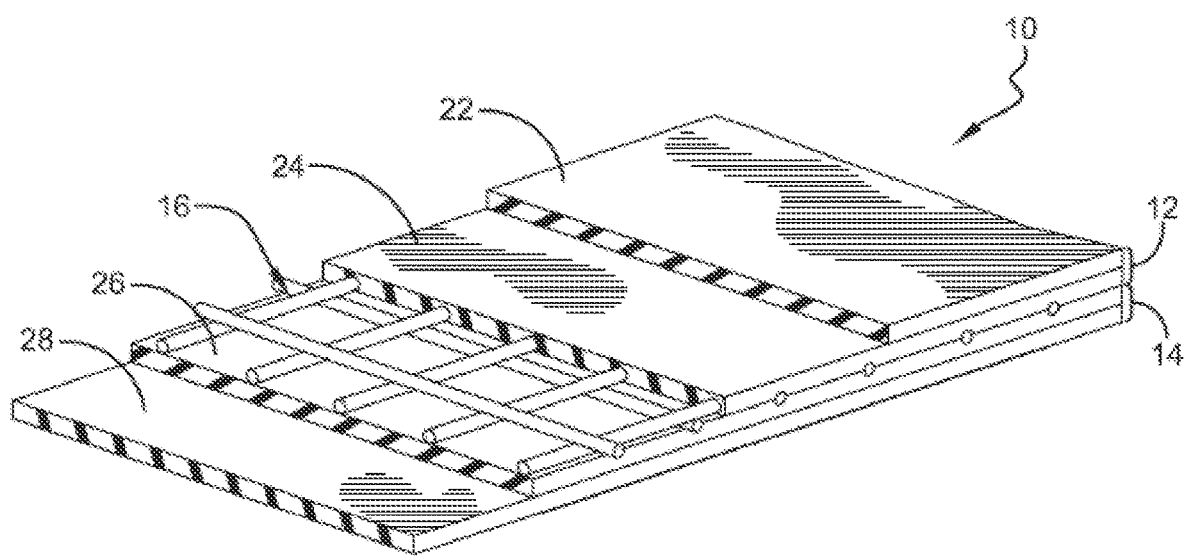
FIG. 2 is a perspective view of four-layered laminate membrane according to embodiments of the present invention.

In other embodiments, which may be described with reference to FIG. 2, panel 10 is a planar body that includes four distinct layers including top layer 22, upper middle layer 24, lower middle layer 26, and bottom layer 28. As shown, top layer 22 and upper middle layer 24 may be collectively referred to as upper combination or layer 12, and lower middle layer 26 and bottom layer 28 may be collectively referred to as lower combination or layer 14. As with the embodiments of FIG. 1, layer 12 and layer 14 may be laminated to each other, and an optional reinforcement 16 (e.g. scrim reinforcement) may be sandwiched between the layers. In one or more embodiments, top layer 22 and upper middle layer 24 may be a single extrudate formed by, for example, co-extrusion techniques. Likewise, upper middle layer 26 and bottom layer 28 may include a single extrudate formed by, for example, co-extrusion techniques.

As suggested above, one or more layers of the membranes of this invention include a blend of $Mg(OH)_2$ and $CaCO_3$. With reference to FIGS. 1 and 2, top layer 22 includes $Mg(OH)_2$ and is devoid or substantially devoid of calcium carbonate. Upper middle layer 24 includes $Mg(OH)_2$ and $CaCO_3$. Likewise, layer 14 (including both layers 26 and 28 of FIG. 2) include $Mg(OH)_2$ and $CaCO_3$.

In specific embodiments, top layer 22 includes more than 20 wt %, in other embodiments more than 25 wt %, and in other embodiments more than 30 wt % $Mg(OH)_2$ based upon the entire weight of the layer (including the thermoplastic resin). In these or other embodiments, top layer 22 includes less than 50 wt %, in other embodiments less than 45 wt %, and in other embodiments less than 40 wt % $Mg(OH)_2$ based upon the entire weight of the layer (including the thermoplastic resin). In one or more embodiments, top layer 22 includes from about 20 to about 50 wt %, in other embodiments from about 25 to about 45 wt %, and in other embodiments from about 30 to about 40 wt % $Mg(OH)_2$ based upon the entire weight of the layer (including the thermoplastic resin).

In these specific embodiments, top layer 22 includes 0 wt %, in other embodiments more than 0.1 wt %, and in other embodiments more than 0.2 wt % $CaCO_3$ based upon the entire weight of the layer (including the thermoplastic resin). In these or other embodiments, top layer 22 includes less than 3 wt %, in other embodiments less than 1 wt %, and in other embodiments less than 0.5 wt % $CaCO_3$ based upon the entire weight of the layer (including the thermoplastic resin). In one or more embodiments, top layer 22 includes from about 0 to about 3 wt %, in other embodiments from about 0.1 to about 1 wt %, and in other embodiments from about 0.2 to about 0.5 wt % $CaCO_3$ based upon the entire weight of the layer (including the thermoplastic resin). In one or more embodiments, top layer 22 is devoid of $CaCO_3$ and in other embodiments substantially devoid of $CaCO_3$, which refers to that amount or less that does not have appreciable impact on practice of the invention.

In these specific embodiments, upper middle layer 24 includes more than 10 wt %, in other embodiments more than 15 wt %, and in other embodiments more than 18 wt % $Mg(OH)_2$ based upon the entire weight of the layer (including the thermoplastic resin). In these or other embodiments, upper middle layer 24 includes less than 40 wt %, in other embodiments less than 30 wt %, and in other embodiments less than 25 wt % $Mg(OH)_2$ based upon the entire weight of the layer (including the thermoplastic resin). In one or more embodiments, upper middle layer 24 includes from about 10 to about 40 wt %, in other embodiments from about 15 to about 30 wt %, and in other embodiments from about 18 to about 24 wt % $Mg(OH)_2$ based upon the entire weight of the layer (including the thermoplastic resin).

In these specific embodiments, upper middle layer 24 includes more than 10 wt %, in other embodiments more than 20 wt %, and in other embodiments more than 25 wt % $CaCO_3$ based upon the entire weight of the layer (including the thermoplastic resin). In these or other embodiments, upper middle layer 24 includes less than 50 wt %, in other embodiments less than 40 wt %, and in other embodiments less than 35 wt % $CaCO_3$ based upon the entire weight of the layer (including the thermoplastic resin). In one or more embodiments, upper middle layer 24 includes from about 10 to about 50 wt %, in other embodiments from about 20 to about 40 wt %, and in other embodiments from about 25 to about 35 wt % $CaCO_3$ based upon the entire weight of the layer (including the thermoplastic resin).

In these specific embodiments, lower combination 14 (both layers 26 and 28 shown in FIG. 2 or simply bottom layer 14 shown in FIG. 1) includes 0 wt %, in other embodiments more than 1 wt %, and in other embodiments more than 2 wt % $Mg(OH)_2$ based upon the entire weight of the layer (including the thermoplastic resin). In these or other embodiments, lower combination 14 includes less than 6 wt %, in other embodiments less than 2 wt %, and in other embodiments less than 1 wt % $Mg(OH)_2$ based upon the entire weight of the layer (including the thermoplastic resin). In one or more embodiments, lower combination 14 includes from about 0 to about 6 wt %, in other embodiments from about 0.5 to about 2 wt %, and in other embodiments from about 1 to about 2 wt % $Mg(OH)_2$ based upon the entire weight of the layer (including the thermoplastic resin). In one or more embodiments, lower combination 14 is devoid of $Mg(OH)_2$ and in other embodiments substantially devoid of $Mg(OH)_2$, which refers to that amount or less that does not have appreciable impact on practice of the invention.

In these specific embodiments, lower combination 14 includes more than 25 wt %, in other embodiments more than 35 wt %, and in other embodiments more than 45 wt % $CaCO_3$ based upon the entire weight of the layer (including the thermoplastic resin). In these or other embodiments, lower combination 14 includes less than 75 wt %, in other embodiments less than 65 wt %, and in other embodiments less than 55 wt % $CaCO_3$ based upon the entire weight of the layer (including the thermoplastic resin). In one or more embodiments lower combination 14 includes from about 25 to about 75 wt %, in other embodiments from about 35 to about 65 wt %, and in other embodiments from about 45 to about 55 wt % $CaCO_3$ based upon the entire weight of the layer (including the thermoplastic resin).

Membrane Composition

Polyolefins

As indicated above, one or more layers of the membranes of the present invention are fabricated by using one or more polyolefin thermoplastic resins. Several polyolefin thermoplastic resins, which may also be referred to as polyolefin-based thermoplastic resins, may be employed. For example, useful polyolefin-based thermoplastic resins include olefin-based reactor copolymers, linear low-density polyethylene, propylene-based elastomers, plastomers, functionalized polyolefins, and ethylene-based olefinic block copolymer.

In one or more embodiments, the olefinic-based reactor copolymer, which may also be referred to as in-reactor copolymer, include those polymers that are generally known in the art and to include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel); these materials are believed to include in-reactor blends of ethylene-propylene rubber and polypropylene or polypropylene copolymers. Other useful thermoplastic olefins include those available under the tradename TOOG-00(Ineos). In one or more embodiments, the in-reactor copolymers may be physically blended with other polyolefins. For example, in reactor copolymers may be blended with linear low density polyethylene.

In one or more embodiments, the low density polyethylene includes an ethylene-α-olefin copolymer. In one or more embodiments, the low density polyethylene includes linear low density polyethylene. The linear low density polyethylene employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the linear low density polyethylene of one or more embodiments of this invention may include butene-1, pentene-1, hexene-1, octene-1, or 4-methyl-pentene-1. In one or more embodiments, the linear low density polyethylene is devoid or substantially devoid of propylene mer units (i.e., units deriving from propylene). Substantially devoid refers to that amount or less of propylene mer units that would otherwise have an appreciable impact on the copolymer or the compositions of this invention if present.

The linear low density polyethylene employed in one or more embodiments of this invention can be characterized by a density of from about 0.885 g/cc to about 0.930 g/cc, in other embodiments from about 0.900 g/cc to about 0.920 g/cc, and in other embodiments from about 0.900 g/cc to about 0.910 g/cc per ASTM D-792.

In one or more embodiments, the linear low density polyethylene may be characterized by a melt index of from about 0.2 to about 50 dg/min, in other embodiments from about 0.4 to about 20 dg/min, and in other embodiments from about 0.6 to about 10 dg/min per ASTM D1238 or ISO 1133 at 190° C. and 2.16 kg load.

The linear low density polyethylene of one or more embodiments of this invention may be prepared by using a convention Ziegler Natta coordination catalyst system.

Useful linear low density polyethylene includes those that are commercially available. For example, linear low density polyethylene can be obtained under the tradename Dowlex™ 2038, 2045, and 2267G (Dow); under the tradename DFDA-1010 NT7 (Dow); or under the tradename GA502023 (Lyondell); or under the tradename LLDPE LL (ExxonMobil).

In general, the ethylene-based olefinic block copolymers include block copolymers including a first plurality of ethylene-α-olefin blocks having low α-olefin content and a second plurality of ethylene-α-olefin blocks having a high α-olefin content. For purposes of this specification, the α-olefin may be referred to as a comonomer. Also, for purposes of this specification, the first plurality may be referred to as the hard blocks since these blocks are characterized by a relatively high melt temperature, and the second plurality of blocks may be referred to as the soft blocks since these block are characterized by a low glass transition temperature. In one or more embodiments, the hard blocks are crystallizable and the soft blocks are amorphous. In one or more embodiments, the α-olefin includes $C_4$ or higher α-olefins. In particular embodiments, the α-olefin is selected from butane, hexene, and octene. In particular embodiments, the α-olefin is octene.

In one or more embodiments, the ethylene-based olefinic block copolymer includes hard and soft blocks alternating in $(AB)_n$ pattern where A is a hard block, B is a soft block, and $n$ is an integer greater than 1 including 2, 3, 4, 5, 10, 20, 40, 60, 80, 100, or higher.

As suggested above, the hard blocks, which may also be referred to as hard segments, have a relatively low comonomer content (i.e., α-olefin). In one or more embodiments, the comonomer content (i.e., comonomer in polymerized form) of the hard block is less than 5 wt. %, in other embodiments less than 2 wt. %, and in other embodiments less than 1 wt. %, with the balance of the polymeric units deriving from ethylene. Accordingly, the hard segments may include greater than 95 wt. %, in other embodiments greater than 98 wt. %, and in other embodiments greater than 99 wt. % polymeric units deriving from ethylene. In particular embodiments, the hard segments exclusively include or substantially include ethylene-derived units.

The soft block, which may also be referred to as soft segments, have a relatively high comonomer content (i.e., α-olefin). In one or more embodiments, the comonomer content (i.e., comonomer in polymerized form) of the soft block is greater than 5 wt. %, in other embodiments greater than 8 wt. %, in other embodiments greater than 10 wt. %, in other embodiments greater than 15 wt. %, in other embodiments greater than 25 wt. %, in other embodiments greater than 35 wt. %, in other embodiments greater than 45 wt. %, and in other embodiments greater than 60 wt. %, with the balance including ethylene-derived units.

In one or more embodiments, the ethylene-based olefinic block copolymers employed in the present invention are characterized by a density of less than 0.9 g/cm$^3$, in other embodiments less than 0.89 g/cm$^3$, in other embodiments less than 0.885 g/cm$^3$, and in other embodiments less than 0.875 g/cm$^3$. In these or other embodiments, the density of the ethylene-based olefinic block copolymers is greater than 0.85 g/cm$^3$ and in other embodiments greater than 0.86 g/cm$^3$. As the skilled person appreciates, density can be determined according to ASTM D-792.

In one or more embodiments, the ethylene-based olefinic block copolymers employed in the present invention are characterized by a melt temperature, as measured by differential scanning calorimetry as described in U.S. Publ. No. 2006/0199930, of at least 105, in other embodiments at least 110, in other embodiments at least 115, and in other embodiments at least 120° C. In these or other embodiments, the ethylene-based olefinic block copolymers are characterized by a melt temperature of less than 130 and in other embodiments less than 125° C.

In one or more embodiments, the first EBOC, which is characterized by a relatively low melt index, may have a melt index, as determined by ASTM D1238 or ISO 1133 (2.16 kg load at 190° C.), of less than 5 g/10 min, in other embodiments less than 2 g/10 min, and in other embodiments less than 1 g/10 min. In these or other embodiments, the melt index of the first EBOC is from about 0.1 to about 5 g/10 min, in other embodiments from about 0.3 to about 2 g/10 min, and in other embodiments from about 0.5 to about 1 g/10 min.

In one or more embodiments, the second EBOC, which is characterized by a relatively high melt index, as determined by ASTM D1238 or ISO 1133 (2.16 kg load at 190° C.), may have a melt index of greater than 5 g/10 min, in other embodiments greater than 15 g/10 min, and in other embodiments greater than 25 g/10 min. In these or other embodiments, the melt index of the second EBOC is from about 5 to about 50 g/10 min, in other embodiments from about 15 to about 40 g/10 min, and in other embodiments from about 25 to about 35 g/10 min.

In one or more embodiments, the ethylene-based olefinic block copolymers employed in the present invention are characterized by a glass transition temperature, as measured by differential scanning calorimetry, of at less than 0° C., in other embodiments less than −20° C., in other embodiments less than −30° C., and in other embodiments less than −40° C. In these or other embodiments, the ethylene-based olefinic block copolymers are characterized by a glass transition temperature of from about −50° C. to about 0° C.

Useful ethylene-based olefinic block copolymers that may be employed in the present invention are known in the art as described in U.S. Pat. Nos. 7,893,166 and 7,355,089 and U.S. Publ. No. 2010/0084158, which are incorporated herein by reference. Useful ethylene-based olefinic block copolymers are commercially available under the tradename INFUSE (Dow Chemical Company) including those specific polymers available under the tradenames 9010 and 9900.

In one or more embodiments, useful propylene-based elastomers include propylene-based elastomers that have isotactic propylene sequences long enough to crystallize. In this regard, U.S. Pat. No. 6,927,258, and U.S. Publ. Nos. 2004/0198912 and 2010/0197844 are incorporated herein by reference. In one or more embodiments, the propylene-based elastomer is propylene/alpha-olefin copolymer with semi-crystalline isotactic propylene segments. The alpha-olefin content (e.g. polymerized ethylene content) may range from about 5 to about 18%, or in other embodiments from about 10 to about 15%.

In one or more embodiments, the propylene-based elastomer is characterized by a melting point that is less than 110° C. and a heat of fusion of less than 75 J/g. In one embodiment, the propylene based elastomers of the present invention have a glass transition temperature (Tg) range of about −25 to −35° C. The Tg as used herein is the temperature above which a polymer becomes soft and pliable, and below which it becomes hard and glassy. The propylene based plastomers and elastomers of the present invention have a MFR range measured at 230° C. of between about 0.5 to about 25, and a melt temperature range of about 50 to 120° C. In one embodiment, the propylene based elastomers of the present invention have a shore A hardness range of about 60 to about 90.

In one or more embodiments, the propylene-based elastomer is blended with a propylene-based thermoplastic resin, which may include a crystalline resin. In particular embodiments, the propylene-based thermoplastic resin is characterized by a melting point that is greater than 110° C. and a heat of fusion greater than 75 J/g. In one or more embodiments, the propylene-based thermoplastic resin is stereoregular polypropylene. In one or more embodiments, the ratio of the propylene-based elastomer to the propylene-based thermoplastic resin within the blend composition may vary in the range of 1:99 to 95:5 by weight and, in particular, in the range 2:98 to 70:30 by weight.

In one embodiment, the propylene-based elastomers may have a flexural modulus range of about 500 to about 6000 psi, preferably about 1500-5000 psi.

As suggested above, one or more layers of the membranes of the present invention may include a functionalized thermoplastic resin. In one or more embodiments, the functionalized polymer is a thermoplastic polymer that includes at least one functional group. The functional group, which may also be referred to as a functional substituent or functional moiety, includes a hetero atom. In one or more embodiments, the functional group includes a polar group. Examples of polar groups include hydroxy, carbonyl, ether, ester halide, amine, imine, nitrile, oxirane (e.g., epoxy ring) or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer. In these or other embodiments, the functional group may include an ester group. In specific embodiments, the ester group is a glycidyl group, which is an ester of glycidol and a carboxylic acid. A specific example is a glycidyl methacrylate group.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5,624,999, and 6,503,984, which are incorporated herein by reference.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight ($M_w$) of from about 100 kg/mole to about 2,000 kg/mole, and in other embodiments from about 300 kg/mole to about 600 kg/mole. They may also characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymer, prior to grafting, may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load.

In one or more embodiments, these thermoplastic resins, prior to grafting, may have a melt temperature ($T_m$) that is from about 110° C. to about 250° C., in other embodiments from about 120 to about 170° C., and in other embodiments from about 130° C. to about 165° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° C. to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization, in these or other embodiments, the functionalized thermoplastic polymers may include less than 10% by weight, in other embodiments less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by a melt flow rate of from about 20 to about 2,000 dg/min, in other embodiments from about 100 to about 1,500 dg/min, and in other embodiments from about 150 to about 750 dg/min, per ASTM D-1238 at 230° C. and 2.16 kg load. In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min, per ASTM D-1238 at 190° C. and 2.16 kg load.

Functionalized thermoplastic polymers are commercially available. For example, maleated propylene-based polymers may be obtained under the tradename FUSABOND™ (DuPont), POLYBOND™ (Crompton), and EXXELOR™ (ExxonMobil). Another example includes polymers or oligomers including one or more glycidyl methacrylate groups such as Lotader™ AX8950 (Arkema).

Mineral Filler

In one or more embodiments, the mineral fillers (e.g. $CaCO_3$) are characterized by an average particle size of at least 1 μm, in other embodiments at least 2 μm, in other embodiments at least 3 μm, in other embodiments at least 4 μm, and in other embodiments at least 5 μm. In these or other embodiments, the mineral fillers are characterized by an average particle size of less than 15 μm, in other embodiments less than 12 μm, in other embodiments less than 10 μm, and in other embodiments less than 8 μm. In these or other embodiments, the mineral filler has an average particle size of between 1 and 15 μm, in other embodiments between 3 and 12 μm, and in other embodiments between 6 and 10 μm.

Other Ingredients

As indicated above, besides the flame-retardant fillers (i.e., $Mg(OH)_2$ and $CaCO_3$) and the polyolefin resin, any given layer of the membranes of the present invention (e.g., one or more layers of the membranes) may also include other ingredients such as those that are convention in thermoplastic membranes. For example, other useful additives or constituents may include stabilizers, pigments, flame retardants (other than $Mg(OH)_2$) and fillers (other than $CaCO_3$).

Generally, embodiments of the invention are not limited by the amount of other additives that may be included within the thermoplastic roofing membranes of the present invention. In one or more embodiments, any given layer of the membranes described herein may include from about 0.1 to about 50 wt %, in other embodiments from about 0.5 to 20 wt %, and in other embodiments from 1 to 10 wt %, based upon the entire weight of the layer, of the additional additive such as an additional filler or flame retardant.

In one or more embodiments, the membranes of the invention may include stabilizers. Stabilizers may include one or more of a UV stabilizer, an antioxidant, and an antiozonant. UV stabilizers include Tinuvin™ 622. Antioxidants include Irganox™ 1010.

In one or more embodiments, a multitude of pigments may be employed including, but not limited to, carbon black, titanium dioxide, and zinc oxide.

In one or more embodiments, the fillers, which may also be referred to as mineral fillers, include inorganic materials that may aid in reinforcement, heat aging resistance, green strength performance, and/or flame resistance. In other embodiments, these materials are generally inert with respect to the composition therefore simply act as diluent to the polymeric constituents. In one or more embodiments, mineral fillers include clays, silicates, titanium dioxide, talc (magnesium silicate), mica (mixtures of sodium and potassium aluminum silicate), alumina trihydrate, antimony trioxide, titanium dioxide, silica, calcium borate ore, and mixtures thereof. In one or more embodiments, the fillers are not surface modified or surface functionalized.

Suitable clays may include airfloated clays, water-washed clays, calcined clays, surface-treated clays, chemically-modified clays, and mixtures thereof.

Suitable silicates may include synthetic amorphous calcium silicates, precipitated, amorphous sodium aluminosilicates, and mixtures thereof.

Suitable silica (silicon dioxide) may include wet-processed, hydrated silicas, crystalline silicas, and amorphous silicas (noncrystalline).

In one or more embodiments, useful flame retardants include and compound that will increase the burn resistivity, particularly flame spread such as tested by UL 94 and/or UL 790, of the laminates of the present invention. Useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include aluminum trihydrate, zinc borate, ammonium polyphosphate, melamine polyphosphate, and antimony oxide ($Sb_2O_3$). Ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate.

In one or more embodiments, treated or functionalized magnesium hydroxide may be employed. For example, magnesium oxide treated with or reacted with a carboxylic acid or anhydride may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. In other embodiments, the magnesium hydroxide may be treated with maleic anhydride. Treated magnesium hydroxide is commercially available. For example, Zerogen™ 50.

Examples of halogenated flame retardants may include halogenated organic species or hydrocarbons such as hexabromocyclododecane or N,N'-ethylene-bis-(tetrabromophthalimide). Hexabromocyclododecane is commercially available under the tradename CD-75P™ (ChemTura). N,N'-ethylene-bis-(tetrabromophthalimide) is commercially available under the tradename Saytex™ BT-93 (Albemarle).

In one or more embodiments, the use of char-forming flame retardants (e.g. ammonium polyphosphate and melamine polyphosphate) has unexpectedly shown advantageous results when used in conjunction with nanoclay within the cap layer of the laminates of the present invention. It is believed that there may be a synergistic effect when these compounds are present in the cap layer. As a result, the cap layer of the laminates of the certain embodiments of the present invention are devoid of or substantially devoid of halogenated flame retardants and/or flame retardants that release water upon thermal decomposition. Substantially devoid referring to that amount or less that does not have an appreciable impact on the laminates, the cap layer, and/or the burn resistivity of the laminates.

In one or more embodiments, one or more layers of the membranes of the present invention may include expandable graphite, which may also be referred to as expandable flake graphite, intumescent flake graphite, or expandable flake. Generally, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation. Expandable graphite useful in the applications of the present invention are generally known as described in International Publ. No. WO/2014/078760, which is incorporated herein by reference.

Commercially available examples of expandable graphite include HPMS Expandable Graphite (HP Materials Solutions, Inc., Woodland Hills, CA) and Expandable Graphite Grades 1721 (Asbury Carbons, Asbury, NJ). Other commercial grades contemplated as useful in the present invention include 1722, 3393, 3577, 3626, and 1722HT (Asbury Carbons, Asbury, NJ).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

In one or more embodiments, one or more layers of the membranes of the present invention include a nanoclay. Nanoclays include the smectite clays, which may also be referred to as layered silicate minerals. Useful clays are generally known as described in U.S. Pat. No. 6,414,070 and U.S. Pat. Publ. No. 2009/0269565, which are incorporated herein by reference. In one or more embodiments, these clays include exchangeable cations that can be treated with organic swelling agents such as organic ammonium ions, to intercalate the organic molecules between adjacent planar silicate layers, thereby substantially increasing the interlayer spacing. The expansion of the interlayer distance of the layered silicate can facilitate the intercalation of the clay with other materials. The interlayer spacing of the silicates can be further increased by formation of the polymerized monomer chains between the silicate layers. The intercalated silicate platelets act as a nanoscale (sub-micron size) filler for the polymer.

Intercalation of the silicate layers in the clay can take place either by cation exchange or by absorption. For intercalation by absorption, dipolar functional organic molecules such as nitrile, carboxylic acid, hydroxy, and pyrrolidone groups are desirably present on the clay surface. Intercalation by absorption can take place when either acid or non-acid clays are used as the starting material. Cation exchange can take place if an ionic clay containing ions such as, for example, $Na^+$, $K^+$, $Ca^{++}$, $Ba^{++}$, and $Li^+$ is used. Ionic clays can also absorb dipolar organic molecules.

Smectite clays include, for example, montmorillonite, saponite, beidellite, hectorite, and stevensite. In one or more embodiments, the space between silicate layers may be from about 15 to about 40×, and in other embodiments from about 17 to about 36×, as measured by small angle X-ray scattering. Typically, a clay with exchangeable cations such as sodium, calcium and lithium ions may be used. Montmorillonite in the sodium exchanged form is employed in one or more embodiments.

Organic swelling agents that can be used to treat the clay include quaternary ammonium compound, excluding pyridinium ion, such as, for example, poly(propylene glycol)bis (2-aminopropyl ether), poly(vinylpyrrolidone), dodecylamine hydrochloride, octadecylamine hydrochloride, and dodecylpyrrolidone. These treated clays are commercially available. One or more of these swelling agents can be used.

Method of Making

In one or more embodiments, the compositions and membranes of the present invention may be prepared by employing conventional techniques. The polymeric composition that may be extruded to form the polymeric sheet may include the ingredients or constituents described herein. For example, the polymeric composition may include thermoplastic polyolefin and flame-retardant fillers (i.e., $Mg(OH)_2$ and $CaCO_3$). The ingredients may be mixed together by employing conventional polymer mixing equipment and techniques. In one or more embodiments, an extruder may be employed to mix the ingredients. For example, single-screw or twin-screw extruders may be employed. The various ingredients can be separately fed into an extruder and pelletized or directly extruded into membrane or laminate sheet. In other embodiments, the various ingredients can be combined and mixed within a mixing apparatus such as an internal mixer and then subsequently fabricated into membrane sheets or laminates.

In one or more embodiments, the membranes of the present invention may be prepared by extruding a polymeric composition into a sheet. Multiple sheets may be extruded and joined to form a laminate. A membrane including a reinforcing layer may be prepared by extruding at least one sheet on and/or below a reinforcement (e.g., a scrim). In other embodiments, the polymeric layer may be prepared as separate sheets, and the sheets may then be calandered with the scrim sandwiched there between to form a laminate. In one or more embodiments, one or more layers of the membranes of the present invention are prepared by employing coextrusion technology. Useful techniques include those described in co-pending U.S. Ser. Nos. 11/708,898 and 11/708,903, which are incorporated herein by reference.

Following extrusion, and after optionally joining one or more polymeric layers, or optionally joining one or more polymeric layer together with a reinforcement, the membrane may be fabricated to a desired thickness. This may be accomplished by passing the membrane through a set of squeeze rolls positioned at a desired thickness. The membrane may then be allowed to cool and/or rolled for shipment and/or storage.

INDUSTRIAL APPLICABILITY

The membranes of one or more embodiments of the present invention are useful in a number of applications. In one embodiment, the membranes may be useful for roofing membranes that are useful for covering flat or low-sloped roofs. In other embodiments, the membranes may be useful as geomembranes. Geomembranes include those membranes employed as pond liners, water dams, animal waste treatment liners, and pond covers.

As described above, the membranes of one or more embodiments of the present invention may be employed as roofing membranes. These membranes include thermoplastic roofing membranes including those that meet the specifications of ASTM D-6878-03. These membranes maybe employed to cover flat or low/sloped roofs. These roofs are generally known in the art as disclosed in U.S. Ser. Nos. 60/586,424 and 11/343,466, and International Application No. PCT/US2005/024232, which are incorporated herein by reference.

Figure 3:
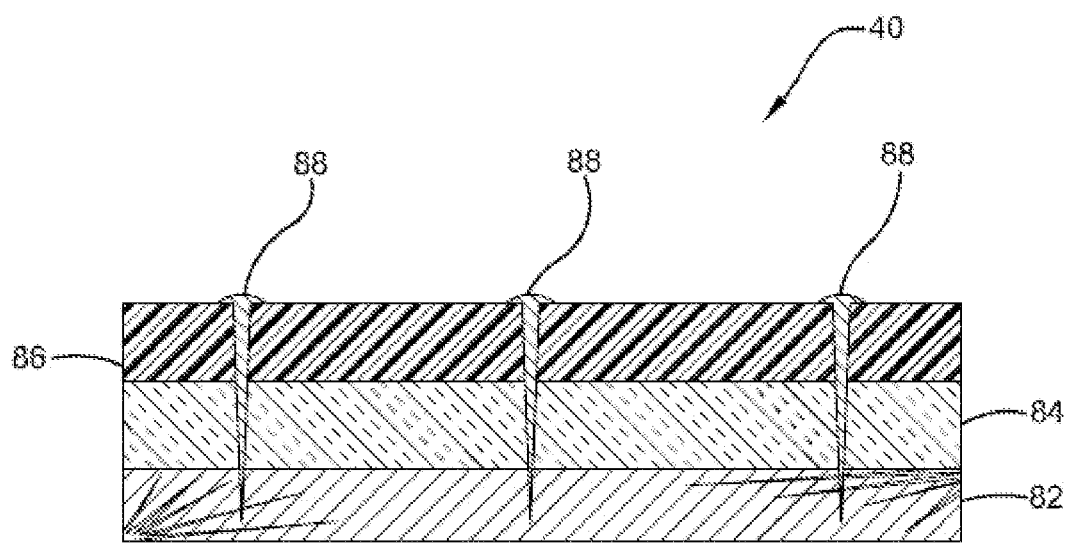
FIG. 3 is a perspective, cross-sectional view of a mechanically-attached roof assembly according to embodiments of the present invention.

In one or more embodiments, the membranes of the present invention can advantageously be used to prepare mechanically-attached roofing systems. For example, as shown in FIG. 3, a mechanically-attached roofing system 40 include roof deck 82, optional insulation layer 84, thermoplastic membrane 86, which is in accordance with the present invention, and a plurality of fasteners 88. The fasteners may be used in conjunction with fastening plates or bars. Further, these fastening devices may be sealed by use of a patch or other form of synthetic membrane or caulk. Advantageously, the process can be used to construct a mechanically-attached roofing system meeting the standards of UL and Factory Mutual for wind uplift (e.g., FM 4470).

Figure 4:
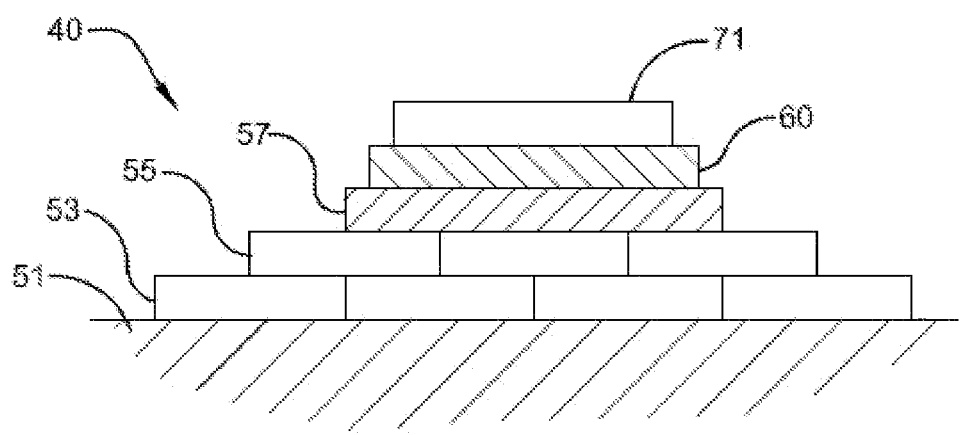
FIG. 4 is a cross-sectional view of a fully-adhered roofing system according to embodiments of the present invention.

In other embodiments, the membranes of the present invention can be used to prepare fully-adhered roofing systems. The fully-adhered roofing systems of the present invention can be described with reference to FIG. 4. Roofing system 40 includes a roof deck 51, optional insulation layer 53, optional protection layer 55, optional existing membrane 57, adhesive layer 60, and membrane 71, where membrane 71 is a membrane according to one or more embodiments of the present invention. For purposes of this specification, the material to which the adhesive secures the membrane, which is the uppermost layer, can be referred to as the substrate. For example, where the membrane is adhesively secured to an insulation board or layer, the insulation board or layer may be referred to as a substrate.

The substrate to which the membrane may be attached may include a roof deck, which may include steel, concrete, and/or wood. In these or other embodiments, the membranes may be applied over additional materials, such as insulation boards and cover boards. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood. In yet other embodiments, the membranes may be applied over existing membranes. These existing membranes may include cured rubber systems such as EPDM membranes, thermoplastic polymers systems such as TPO membranes, or asphalt-based systems such as modified asphalt membranes and/or built roof systems. Regardless of any intervening materials, the membrane may ultimately be mechanically attached to the roof deck using known techniques.

Practice of this invention is not limited by the selection of any particular roof deck. Accordingly, the roofing systems herein can include a variety of roof decks. Exemplary roof decks include concrete pads, steel decks, wood beams, and foamed concrete decks.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which are incorporated herein by reference.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

In one or more embodiments, cover boards may include high density polyurethane or polyisocyanurate board as disclosed in U.S. Publ. Nos. 2006/0127664, 2013/0164524, 2014/0011008, 2013/0036694, and 2012/0167510, which are incorporated herein by reference. In other embodiments, the cover boards may include construction boards such as DensDeck.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

Practice of the present invention is also not necessarily limited by the adhesive employed to bond the membrane to the substrate. For example, the adhesive may include an adhesive that forms a bond through curing action such as is the case with a liquid bond adhesive (e.g. a butyl rubber adhesive) or a polyurethane adhesive. In other embodiments, the adhesive may be a pressure-sensitive adhesive, which may be applied to the membrane at the location where the membrane is manufactured (e.g. a factory-applied pressure-sensitive adhesive).

As used within the specification, the term "fully-adhered roofing system" refers to a roofing system wherein the primary mode of attachment of the membrane to the underlying substrate is through the use of an adhesive. In one or more embodiments, this mode of attachment includes the situation where at least 50%, in other embodiments at least 70%, in other embodiments at least 90%, and in other embodiments at least 98% of the underlying surface of the membrane (i.e., the substrate-contacting planar surface of the membrane) is adhered to the substrate through an adhesive.

Various modifications and alterations that do not depart from the scope and spirit of this invention will become apparent to those skilled in the art. This invention is not to be duly limited to the illustrative embodiments set forth herein.

What is claimed is:

1. A multi-layered thermoplastic roofing membrane comprising:
 a planar body including at least three layers, said at least three layers including
 (i) a top layer that includes magnesium hydroxide dispersed within a polyolefin-based thermoplastic resin,
 (ii) an upper middle layer disposed below said top layer and including magnesium hydroxide and calcium carbonate dispersed within a polyolefin-based thermoplastic resin, and
 (iii) a lower layer disposed below said upper middle layer and including magnesium hydroxide and calcium carbonate dispersed within a polyolefin-based thermoplastic resin.

2. The roofing membrane of claim 1, where the membrane includes a reinforcement disposed between said upper middle layer and said lower layer.

3. The roofing membrane of claim 1, where the top layer includes from about 20 to about 50 wt % magnesium hydroxide based upon the entire weight of the layer.

4. The roofing membrane of claim 1, where the top layer includes from about 30 to about 40 wt % magnesium hydroxide based upon the entire weight of the layer.

5. The roofing membrane of claim 1, where top layer is devoid of calcium carbonate.

6. The roofing membrane of claim 1, where the upper middle layer includes from about 10 to about 40 wt % magnesium hydroxide based upon the entire weight of the layer.

7. The roofing membrane of claim 1, where the upper middle layer includes from about 10 to about 50 wt % calcium carbonate based upon the entire weight of the layer.

8. The roofing membrane of claim 1, where the lower layer includes from about 0 to about 6 wt % magnesium hydroxide based upon the entire weight of the layer.

9. The roofing membrane of claim 1, where the lower layer includes from about 25 to about 75 wt % calcium carbonate based upon the entire weight of the layer.

10. The roofing membrane of claim 1, where the top layer includes less than 3 wt % calcium carbonate based upon the entire weight of the layer.

11. The roofing membrane of claim 1, where the top layer and the upper middle layer are co-extruded layers.

12. A roof system comprising:
 a substrate and thermoplastic membrane affixed to the substrate, where the thermoplastic membrane is a planar body including at least three layers, said at least three layers including
 (i) a top layer that includes magnesium hydroxide dispersed within a polyolefin-based thermoplastic resin,
 (ii) an upper middle layer disposed below said top layer and including magnesium hydroxide and calcium carbonate dispersed within a polyolefin-based thermoplastic resin, and
 (iii) a lower layer disposed below said upper middle layer and including magnesium hydroxide and calcium carbonate dispersed within a polyolefin-based thermoplastic resin.

13. The roof system of claim 12, where the substrate is selected from the group consisting of a roof deck, an insulation board, a cover board, and an existing membrane.

14. The roof system of claim 12, where the thermoplastic membrane includes first and second opposed planar surface with one of the opposed planar surfaces being adhered to the substrate.

15. The roof system of claim 12, where at least 50% of the at least one planar surface of the membrane is adhered to the substrate.

16. The roof system of claim 12, where the membrane is adhered to the substrate through a polyurethane adhesive.

17. The roof system of claim 12, where the membrane is adhered to the substrate through a pressure-sensitive adhesive.

* * * * *